May 4, 1971 J. EDGE 3,577,276
ELECTRICAL RESISTORS
Original Filed Sept. 26, 1967
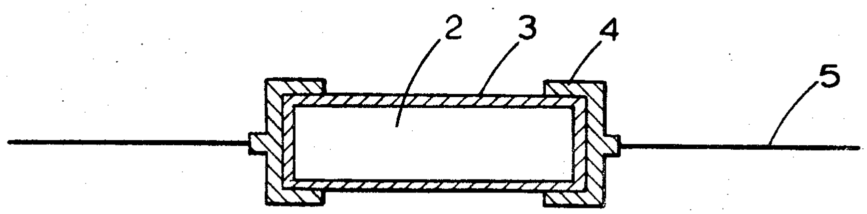
JAMES EDGE
INVENTOR.
BY Stephen A. Frishauf
Atty

3,577,276
ELECTRICAL RESISTORS

James Edge, Morpeth, England, assignor to Welwyn Electric Limited, Bedlington, Northumberland, England Original application Sept. 26, 1967, Ser. No. 670,687. Divided and this application Nov. 12, 1969, Ser. No. 871,279
Claims priority, application Great Britain, Sept. 27, 1966, 43,028/66
Int. Cl. C23b 5/62
U.S. Cl. 117—213 2 Claims

ABSTRACT OF THE DISCLOSURE

Electrical precision resistors having a ceramic former are provided with a resistance film of a nickel-phosphorus alloy with an electrical surface resistance value between 0.5 ohm to 500 kilohms per square, the alloy containing from 5 to 16% by weight of phosphorus, the thickness of the film varying from 220 A. to 25,000 A. and the root-mean-square deviation of film thickness between different samples of area with a dimension greater than 0.01 x 0.01 cm. is at most 8% of the mean thickness at the lowest electrical resistance value and at most 4% at the highest electrical resistance value; the manufacture of these resistors is effected batch-wise by a method involving reactivating a catalytic palladium layer, before electrolessly depositing the nickel-phosphorus film while tumbling the resistors in the plating solution, by washing with a reactivating solution containing hypophosphite and nickel ions, and the deposited nickel-phosphorus film is stabilized by heating in air to a temperature of from 100 to 400° C.

The present case is a division of my application Ser. No. 670,687, entitled "Electrical Resistors," filed Sept. 26, 1967, now U.S. Pat. 3,522,086 claiming British priority of Sept. 27, 1966.

BACKGROUND OF THE INVENTION

The resistors of the present invention are produced by the electroless deposition of a nickel-phosphorus film on a former, e.g. of porcelain, alumina, steatite or glass or other ceramic or plastics, with an insulation resistance greater than $10^{12}$ ohm cm. at 20° C. As is well known, in the manufacture of film resistors, the former must be sufficiently non-porous to prevent penetration of the chemicals used in the process described hereinafter into the body of the material and also have sufficient chemical stability to withstand the action of these chemicals. The term "precision resistor" as used herein means one having a temperature coefficient of resistance (herein also referred to as T.C.R.) within the range ±150 parts per million (i.e. p.p.m.) per ° C., and a stability of resistance of better than 1% after 1,000 hours load endurance under conditions such that the maximum temperature of the resistor does not exceed 150° C. in the case of films with a surface resistivity up to 10 kilohms per square or 100° C. in the case of films with a surface resistivity greater than 10 kilohms per square.

Various materials have been produced previously in the form of thin films in attempts to achieve these requirements, including vacuum evaporated metal alloys and cermets, vapour deposited metals and electrolessly deposited alloys. From all of these various methods only a few have been found to provide resistive films which possess the desired parameters. Usually, because of the very narrow requirements for the T.C.R. and stability all these previously proposed systems provide thin resistive films having only a very narrow range of surface resistivities, which, in the case of metal films, lie typically between about 10 ohms and about 500 ohms per square.

This restriction in the range of surface resistivities is a disadvantage and seriously limits the range of final resistance values which can be achieved. It is therefore the purpose of this invention to provide electrical resistors with resistive films having a wide range of surface resistivities, i.e. from 0.01 ohm to 1 megohm per square, with a T.C.R. and stability at least as good as that required for a precision resistor.

I have now found that uniformity of film thickness and specific resistivity over the whole area of the resistance film is one of the properties necessary in a precision resistor. Not only is it found impossible to produce satisfactory resistors if there is an appreciable variation of sheet resistance over the surface of one resistor body but in addition it is also essential, in practice, to minimize the average variations in end-to-end resistance between one rod and the next, and indeed to minimize batch-to-batch variations and to be able to predict and control the average sheet resistance produced during any one metallizing process. The importance of achieving adequate uniformity of deposit is shown by the fact that a typical value for the means film thickness of a 1 megohm per square resistance film is a 200 A., and that of a one kilohm per square film 350 A. An error of 40% in the film thickness of a 1 kilohm per square film can therefore result in a thousand-fold increase in surface resistivity. Such a variation in sheet resistance, whether on the surface of one resistor rod, or between different resistor rods, would be quite unacceptable. The relationship between resistivity and film thickness depends on the conditions under which the film is produced, including the nature of the substrate; the film thickness of a 1 megohm film can be as low as 150 A.

I have also found that the precision resistors of the invention must have a certain phosphorus content in the nickel-phosphorus alloy film as specified hereinafter.

SUMMARY OF THE INVENTION

The present invention thus consists in an electrical precision resistor constituted by an insulating former having deposited thereon an electrical resistance film of a nickel-phosphorus alloy, the electrical surface resistance value of said film being 0.01 ohm to 1 megohm per square, said alloy containing from 5 to 20% by weight of phosphorus, the thickness of said film being at least 150 A., the root-mean-square deviation of film thickness between different samples of area with a dimension greater than 0.01 x 0.01 cm. being at most 8% of the mean thickness at the lowest electrical resistance value and at most 4% at the highest electrical resistance value. Since the resistors of the invention will normally be made by a process of producing a plurality of batches of similar resistors, it is to be noted that the requirement concerning the uniformity of film thickness, as given by the said maximum permitted deviation, must be observed not only in each individual resistor, but also in respect of all the resistors in each batch and also from batch to batch.

The precision resistors of the invention preferably have a former of porcelain, steatite, or alumina or other ceramic (e.g. glass), but pastics (e.g. epoxides, alkyds, phenolic and silicone resins) or other material known to be suitable as formers for precision resistors can also be used.

The precision resistors of the invention may be produced by activating the cleaned former by treatment with a solution of a stannous salt, rinsing off the excess of this stannous salt with water, then rinsing with a solution of a palladium salt so as to deposit at least a unimolecular layer of palladium on said former, washing the resulting former to remove excess of palladium salt, treating the washed former in a reactivating solution containing from 0.1% to 2.5% weight/volume of sodium hypophosphite or an equivalent amount of another water soluble hypophosphite (e.g. an alkali or alkaline earth metal, for instance potassium or calcium hypophosphite) and from 0.00005% to 0.005% weight/volume of nickel ions at a temperature suitable for effecting electroless deposition of the desired nickel-phosphorus alloy film for a period of time sufficient to substantially restore the activity of the palladium layer, effecting electroless deposition of the nickel-phosphorus film on the reactivated palladium layer and stabilizing the film by heating.

DESCRIPTION OF THE PREFERRED EMBODIMENTS

The film of nickel-phosphorus alloy is based on the nickel-phosphorus alloy system first mentioned by Wurtz in 1846 and re-discovered in 1946 by Brenner and Riddell. In order to deposit these films on a cleaned insulating former by the process the former or substrate is first treated in such a way that at least a unimolecular layer of a catalytic metal is deposited. For this purpose successive rinses in a stannous chloride solution, in water and then in palladium chloride solution are used to produce a catalytic palladium deposit; this procedure is known as activating. Washing after activating is essential. Electroless deposition of the nickel-phosphorus alloy is effected from a known buffered nickel salt solution, usually maintained at a suitable elevated temperature in known manner, by reduction in known manner with sodium hypophosphite. In order to avoid non-uniform deposition of the film it is known to be desirable to preheat the substrates to a temperature similar to that of the metallizing solution before they are immersed in the latter.

I have now found that the amount of nickel-phosphorus alloy deposited in any given time from a given plating bath varies with the condition of the activated surface and, in general, metallizing does not begin immediately after the activated substrate comes into contact with metallizing solution, but only after a certain induction period has elapsed. I believe that this induction period depends on the extent to which a substrate or part of a substrate is not fully activated or has been accidentally oxidized and therefore deactivated. This, in either event, will result in the deposition of a thinner film in the region concerned. Some reduction in the degree of activation of the substrate surface is probably due to oxidation of the palladium film during the washing operation which is required to remove excess palladium chloride solution, or during subsequent storage in air or water.

A further danger arises due to the need to heat the substrate to a temperature corresponding to that at which the metallizing solution will be maintained in order that known and controllable metallizing conditions will exist from the moment the substrate is brought into contact with the metallizing solution. This need to heat the activated substrate involves additional likelihood of oxidation, and hence deactivation. One is faced therefore with the need to avoid any oxidation or removal of the palladium from the activated substrate and yet, at the same time, to rinse the main bulk of the activating solution from the substrate, possibly to store the substrate for some period of time, and then to elevate the temperature of the substrate immediately prior to immersion in the metallizing bath.

I have found that the undesirable deactivation (by oxidation of the palladium layer) can be reversed by a treatment in solution of a reducing agent. The most useful reducing agent is a hypophosphite, as this is also used in the metallizing solution and there is no need to introduce washing procedures which might damage the reactivated surface. For example, any parts of the substrates which have become deactivated by contact with water so that they would plate at a slower rate than areas which have not been deactivated when immersed in a metallizing solution, can be made to plate at the same rate as the non-deactivated parts if the substrates are given a wash, e.g., of two minutes at room temperature, in a 0.1 to 2.5%, e.g., 2%, weight/volume solution of sodium hypophosphite with a trace (i.e. 0.00005–0.005% weight/volume) of nickel ions, by adding to the solution a nickel salt of the type used in the metallizing baths described hereinafter. The term "nickel ion" as used in this specification includes the total quantity of nickel present in the bath, i.e., nickel which may be present in any undissociated form is included. In this way the activity of the substrate is uniformly restored to its maximum value and at the same time it may be heated in this solution to the plating temperature.

A small amount of nickel is deposited during this treatment with sodium hypophosphite and nickel ions, but I have found that this can be kept at an insignificant level if the amount of nickel salt added to the reducing agent solution is in the region of 0.005% weight/volume of nickel ions. This is found to be sufficient to permit a preheating period of at least 5 minutes at 65° C. to be used. Proportions of nickel ions in excess of 0.05% weight/volume are generally undesirable as this might result in the deposition of significant amounts of nickel during the preheating treatment before conditions of constant temperature and maximum substrate activity are attained. Proportions of nickel ions below 0.00005% weight/volume are not sufficiently effective. The choice of the optimum concentration of nickel ions in the preheating solution depends to some extent on the ratio of solution volume to substrate surface area. The amount of nickel deposited during preheating also depends on this ratio, so it is essential that it should be kept constant. With a nickel ion concentration of 0.0005% weight/volume, the hypophosphite concentration can be any value between 0.1 and 2.5% by weight. When higher concentrations of nickel ions are used, in the range 0.0005 to 0.005% weight/volume, the upper permissible limit of hypophosphite concentration is 2.0% by weight.

At the end of the preheating period, the solution can be removed from the container and replaced by metallizing solution at the same temperature. Alternatively, since the ingredients of the preheating solution are also necessary ingredients of the metallizing solution, the plating reaction can be initiated by adding to the preheating solution a second solution containing the necessary concentration of chemicals to give a mixture with the composition of the required electroless plating solution. An illustration of the advantages to be obtained by this particular step in the process is shown by the following results. In a first experiment a quantity of approximately 100 ceramic rods on which a resistive film is to be deposited by the specific procedures described hereinafter were submitted to the metallizing treatment at 65° C. without any preheating and an average value of sheet resistance of 600 ohms per square was obtained. Based on measurements on 20 ceramic rods, it was found that the root-mean-square deviation of resistance measurements was approximately 20% of this mean value. In a second experiment a similar number of rods was preheated in water for two minutes at a temperature of 65° C. and then metallized utilizing the same metallizing conditions as in the first experiment where no preheating was effected. On this occasion the average sheet resistance was 1,500 ohms per square showing that there had been some significant degree of deactivation. The root-mean-square deviation of the resistance measurements on a sample of 20 rods was now found to be 16% of the mean value, showing that although the average resistance value had been increased some partial improvement in the uniformity had been achieved by this preheating stage. A third experiment was carried out in which the rods were preheated in a solution containing 2% weight/volume of sodium hypophosphite and 0.0015% weight/ volume of hydrated nickel sulphate giving a concentration of 0.0003% weight/volume of nickel ions; it was found that subsequent metallization produced an average sheet resistance of 320 ohms per square. This figure indicates the increased degree of metallization occurring due to the greater activity of the rods and the root-mean-square deviation of measurements on 20 rods was further reduced to 12.5% of the mean value. The above three experiments were repeated but this time the nickel-phosphorus alloy electroless metallizing step was itself adjusted to ensure that the mean sheet resistance value was the same in all three cases; this resulted in an improvement in uniformity evidenced by a reduction in the standard deviation of measurements on a sample of rods when the said rods were preheated, and yet a further improvement when the rods were preheated in a solution which ensured maximum activity of the palladium film.

The temperature coefficient of resistance of a nickel-phosphorus alloy resistor varies with the thickness of the film and also with the composition of the alloy, i.e. with the proportions of elements other than nickel in the film. The phosphorus content is particularly important, and the T.C.R. can be maintained at a very low level over a wide range of surface resistivities by controlling the phosphorus content.

I have found that the phosphorus content of a thin film should be low (e.g. for a film having a surface resistivity of 1 megohm per square preferably about 5%), and that of a thick film should be high (e.g. for a film having a surface resistivity of 10 ohms per square preferably about 16%). The optimum phosphorus content for intermediate values of the surface resistivity increases steadily in this range as the surface resistivity decreases.

There are several ways of producing films with a range of phosphorus contents, e.g. by a variation in the composition of the plating solution. The ratio of the nickel salt to sodium hypophosphite in the plating bath can bring about the desired change and variation of the pH value of the solution has a similar effect, e.g. by changing the pH value of one particular bath from 5.5 to 3.5 the phosphorus content can be varied from 7.5 to 14.6%. (cf. G. Gutzeit, p. 8 of A.S.T.M. Special Technical Publication No. 265, "Symposium on Electroless Nickel Plating," published by the American Society for testing Materials, November 1959). By treating the freshly deposited nickel-phosphorus alloy with alkali solutions phosphorus can be extracted, thus altering the composition of the film. This therefore is yet another method of altering the electrical properties of the film. I have found that the best way of controlling the composition of the film is by varying the pH value of the plating solution. This allows me to vary the phosphorus content between 5 and 20% and produce low T.C.R. films from 0.01 ohm per square to 1 megohm per square.

During the metallizing reaction the metallizing solution should move freely and uniformly around the surfaces to be metallized. This can be satisfactorily achieved, for example, by any method which causes the substrates to vibrate or tumble in a random fashion through the solution while the reaction is proceeding.

When resistive films are deposited it is usually under conditions different from their subsequent operating conditions and therefore when they are used as resistors they are electrically unstable due to the slow chemical and physical changes taking place in moving towards an equilibrium condition. This state of equilibrium can be readily achieved by a known heat treatment which involves heating the film in contact with air at some temperature above the resistor hot spot temperature but below a temperature which is likely to damage the film. The resistivity of the nickel-phosphorus alloy film as freshly prepared, is difficult to measure accurately. However, it is readily stabilized by heat treatment in air and temperatures between 100° C. and 400° C. have been found to produce stable resistors. Care must be taken, especially in the case of plastics formers, that the former is of a material which can withstand the temperature within said range chosen for this heat treatment.

After stabilizing, these films are processed into finished resistors ready for use in the usual way by patterning to the required value, fitting terminals and then coating with an organic protection, using either a stovable lacquer or a thermoplastic or thermosetting resin moulding. These organic jackets serve to protect the film against mechanical and chemical damage and in addition insulate the resistor.

The procedures described hereinafter are concerned with the deposition of a nickel-phosphorous alloy on clean 3 mm. diameter by 10 mm. long porcelain rods with a degree of surface roughness having a centre-line-average index of 35 microinches; the following activation and reactivation procedures were adopted in every case.

Activation 250 rods are placed into a 250 ml. flask to which is then added a sufficient amount of an aqueous solution containing 1% weight/volume stannous chloride and 1% volume/volume hydrochloric acid to just cover the rods. The flask is then swirled from time to time during a period of 15 minutes. The excess solution is poured off the rods and they are thoroughly washed in distilled water. The rods are now covered with an aqueous solution containing 0.1% weight/volume of palladium chloride and 0.25% volume/volume of hydrochloric acid, and the flask is swirled gently for 2 minutes. The excess solution is poured off the rods and they are thoroughly washed in distilled water of pH value between 6 and 8 for a period of about 5 minutes.

Reactivation

The activity of the rods is restored and their temperature raised to the plating bath temperature by placing 250 of them in an aqueous solution containing 2% weight/volume sodium hypophosphite and 0.0005% weight/volume nickel ions at the temperature of the plating bath for 1 minute. The preheat solution is decanted off and the rods immediately covered with the heated plating solution.

Plating and stabilizing

EXAMPLE 1

A solution is prepared by dissolving—

| | Grams |
|---|---|
| Nickel sulphate (hydrated) | 29.1 |
| Sodium hypophosphite | 17.5 |
| Sodium succinate (hydrated) | 1.65 |
| Succinic acid | 7.05 |

in distilled water and diluting to 1 litre. The pH value of the solution is 3.3. 500 ml. of the above solution is heated to 90° C. and transferred to the heated activated rods and the plating reaction is allowed to proceed for 25 minutes. The solution is poured off and the plated rods are washed thoroughly in running tap water. They are then rinsed in distilled water and finally in acetone. They are dried at room temperature in air. The rods are now stabilized by spreading them out on flat trays and heating them for 16 hours in a clean oven at 250° C.

The mean film thickness is 13,000 A., the root-mean-square deviation of film thickness between different samples of areas with dimensions greater than 0.01 x 0.01 cm. being less than 8% of the mean film thickness. The mean surface resistivity after heat treatment is 1 ohm per square with a T.C.R. of +20 to +30 p.p.m./° C. The phosphorus content of this film is 16% by weight.

EXAMPLE 2

A solution is prepared by dissolving—

| | Grams |
|---|---|
| Nickel sulphate (hydrated) | 29.1 |
| Sodium hypophosphite | 17.5 |
| Sodium succinate (hydrated) | 8.34 |
| Succinic acid | 4.08 |

in distilled water and diluting to 1 litre. The pH value of this solution is 4.3. 500 ml. of the above solution is heated to 65° C. and transferred to the heated activated rods and the plating allowed to proceed for a period of 29 seconds. They are washed and stabilized as described in Example 1.

The mean film thickness is 300 A., the root-mean-square deviation of film thickness between different samples of area with dimensions greater than 0.01 x 0.01 cm. being less than 6% of the mean film thickness. The mean surface resistivity after heat treatment is 5 kilohms per square, with a T.C.R. of ±40 p.p.m./° C. The phosphorus content of this film is 9% by weight.

The stability of these films is at least as good as that defined as necessary for a precision resistor. Changes of less than 1% are obtained with the finished resistors after 1,000 hours at 150° C. without any applied load or at any lower temperature with an applied load which does not cause the maximum temperature of the resistor to exceed 150° C.

Further examples of the application of the present invention for the preparation of electrical resistors with a T.C.R. and stability within the previously defined limits for a precision resistor are shown in Table 1. The procedure used in these examples is exactly the same as that specifically described above with the exception that the phosphorus content of the film is varied as shown (for example, by varying the pH value of the solution) and the film thickness is varied by varying the time and/or temperature of deposition.

For the two highest values shown in the table, the stabilizing time at 240° C. was shortened from 16 hours to 2 hours, to avoid unnecessary oxidation of these thin films.

TABLE 1

| Example No. | Surface resistivity, ohms/sq. | T.C.R., p.p.m./° C. | Percent phosphorus | Film thickness in A. |
|---|---|---|---|---|
| 3 | 500,000 | −10 to −100 | 5 | 220 |
| 4 | 50,000 | ±50 | 7 | 250 |
| 5 | 500 | ±50 | 12 | 400 |
| 6 | 50 | ±50 | 12 | 670 |
| 7 | 5 | +10 to +30 | 13 | 2,700 |
| 8 | 0.5 | +50 to +100 | 16 | 25,000 |

Protection and insulation

After patterning to the required resistance value and fitting terminals, the resistive films of the resistors resulting from the above examples are protected by coating with a pigmented varnish prepared from a silicone lacquer such as that supplied by Midland Silicones Ltd., of Reading and known as lacquer MS.994. Coats of another pigmented varnish are then applied on top of the silicone layer. This other varnish is prepared from an epoxy lacquer and hardener supplied by C.I.B.A. (ARL) Ltd., of Duxford and known respectively as Araldite AZ15 and Hardener HZ15.

The remarkable property of the nickel-phosphorus films with the order of uniformity of the resistors of the present invention which allows a wide range of surface resistivities to be obtained, is that there is a marked and very reproducible dependence of specific resistivity on film thickness, over the 100 A. to 1000 A. range of film thickness. Films over 1,000 A. thick have a specific resistivity of the order of $10^{-4}$ ohm cm., the exact value depending on the phosphorus content and on the conditions chosen for any post-deposition steps of the manufacturing process which affect the structure or composition of the film, such as the stabilizing heat treatment.

Surface resistivities of 0.1 ohm per square, 1 ohm per square and 10 ohms per square are therefore obtained by depositing films which are approximately 100,000 A., 10,000 A. and 1,000 A. thick respectively. If the specific resistivity did not vary, a 10,000 ohms per square film would be approximately 1 A. thick, which is of the same order as the dimensions of a single atom, and it is unlikely that even a 10 A. film would be sufficiently stable to be useful as a commercial resistor. In fact, the specific resistivity increases with decreasing film thickness in a manner which depends to some extent on the nature of the substrate, but for the ceramic substrate described in Examples 1 and 2, the specific resistivity of a 200 A. film is about 60,000 times that of a 1,000 A. film. The surface resistivity of the 200 A. film is therefore not just five times as great as that of the 1,000 A. film, but 300,000 times as great.

The above characteristic property of these films is valuable because the whole range of values up to 1 megohm per square can be obtained with films which are greater than 200 A. thick, thus avoiding many undesirable effects which are observed when very thin films of any metal are used. Perhaps the most important of these undesirable effects is the very large and usually uncontrollable variation of the T.C.R. with surface resistivity which is usually observed with other metal or alloy films having a surface resistivity greater than about 300 ohms per square. With these uniform nickel-phosphorus films there is a comparatively small and controllable variation of the T.C.R. with surface resistivity which can be compensated for if the composition of the films is chosen according to the surface resistivity, by adjusting the conditions of deposition to give lower phosphorus contents for the higher value films.

The accompanying diagrammatic drawing shows a resistor of the present invention in cross sectional view. Reference numeral 2 designates a ceramic rod which is submitted to the required cleaning and activation process and then, following the manner of the present invention, is treated in a manner which maintains the degree of activation while its temperature is elevated to that preferred for subsequent metallizing. Reference numeral 3 designates a metal alloy film of nickel and phosphorus which has been electrolessly deposited over the surface of rod 2; end caps 4 and terminal leads 5 are provided to afford electrical connection to the resistive film.

Although the present invention is described herein with particular reference to specific details, it is not intended that such details shall be regarded as limitations upon the scope of the invention except insofar as included in the accompanying claims.

I claim:

1. A process for the production of electrical precision resistors constituted by an insulating former having deposited thereon an electrical resistance film of a nickel-phosphorus alloy, the electrical resistance value of said film being 0.01 ohm to 1 megohm per square, said alloy containing from 5 to 20% by weight of phosphorus, the thickness of said film being at least 150 A. the root-mean-square deviation of film thickness between different samples of areas with a dimension greater than 0.01 x 0.01 cm. being at most 8% of the mean thickness at the lowest electrical resistance value and at most 4% at the highest electrical resistance value, which process comprises activating the cleaned former by treatment with a solution of a stannous salt, rinsing off the excess of this stannous salt with water, then rinsing with a solution of palladium salt so as to deposit at least a unimolecular layer of palladium on sad former, washing the resulting former to remove excess of palladium salt, treating the washed former in a reactivating solution containing from 0.1% to 2.5% weight/volume of sodium hypophosphite or an equivalent amount of another water soluble hypophosphite and from 0.00005% to 0.005% weight/volume of nickel ions at a temperature suitable for effecting electroless deposition of the desired nickel-phosphorus alloy film for a period of time sufficient to substantially restore the activity of the palladium layer, effecting electroless deposition of the nickel phosphorus film on the activated palladium layer and stabilizing the film by heating.

2. A process according to claim 1, in which the electroless deposition of the nickel-phosphorus film on the reactivated palladium layer is effected while vibrating or tumbling in random fashion the rods through a plating bath for depositing the nickel-phosphorus film.

References Cited

UNITED STATES PATENTS

| | | | |
|---|---|---|---|
| 3,172,074 | 3/1965 | Drewes et al. | 117—227X |
| 3,401,057 | 9/1968 | Eckert et al. | 117—62X |

WILLIAM L. JARVIS, Primary Examiner

U.S. Cl. X.R.

117—227, 160; 106—1